United States Patent
Bush

[11] Patent Number: 6,095,401
[45] Date of Patent: Aug. 1, 2000

[54] SYSTEM AND METHOD FOR SUPRESSION OF BUBBLE GENERATION DURING ULTRASONIC WELDING OF A PRINTER CARTRIDGE

[75] Inventor: Stephen Porter Bush, Georgetown, Ky.

[73] Assignee: Lexmark International, Inc., Lexington, Ky.

[21] Appl. No.: 09/469,049

[22] Filed: Dec. 21, 1999

[51] Int. Cl.[7] ............................. B23K 1/06; B65B 7/00; B32B 31/16
[52] U.S. Cl. ...................... 228/110.1; 228/111; 156/69; 156/73.1; 156/580.1
[58] Field of Search ................... 228/110.1, 111, 228/1.1; 347/108; 222/188; 156/69, 73.1, 580.1, 292

[56] References Cited

U.S. PATENT DOCUMENTS

| | | | |
|---|---|---|---|
| 5,574,490 | 11/1996 | Gragg et al. | 347/87 |
| 5,681,740 | 10/1997 | Messier et al. | 438/284.1 |
| 5,875,615 | 3/1999 | Ito et al. | 53/474 |
| 6,010,213 | 1/2000 | Kanaya et al. | 347/87 |
| 6,017,118 | 1/2000 | Gasvoda et al. | 347/86 |

Primary Examiner—Patrick Ryan
Assistant Examiner—Jonathan Johnson
Attorney, Agent, or Firm—Michael T. Sanderson

[57] ABSTRACT

A system and method for suppression of air bubble generation in the ink supply and nozzles of an ink-containing printer cartridge when ultrasonic welding is performed on the ink-containing printer cartridge. The printer cartridge has a top end and a bottom end, and the bottom end includes at least one ink outlet for the ink within the printer cartridge. The system includes a mounting fixture having a recess for receiving and holding at least the lower end of the printer cartridge, an ultrasonic welding device for welding an article to the printer cartridge, and a fluid or liquid, such as water, collected in the bottom of the recess in sufficient quantity such that the at least one ink outlet on the bottom end of the printer cartridge is immersed in the fluid or liquid. The welding device is preferably an ultrasonic welding horn that typically welds a lid to the top end of an ink-containing printer cartridge. The method of performing ultrasonic welding upon the ink containing printer cartridge includes the steps of placing the bottom end of the printer cartridge into the recess of a mounting fixture, immersing the at least one ink outlet within a fluid or liquid in the recess, and ultrasonically welding an article to the printer cartridge.

13 Claims, 3 Drawing Sheets

SYSTEM AND METHOD FOR SUPRESSION OF BUBBLE GENERATION DURING ULTRASONIC WELDING OF A PRINTER CARTRIDGE

BACKGROUND OF THE INVENTION

1. Field of the Invention

The present invention generally relates to the manufacture of printer cartridges. More particularly, the present invention relates to a system and method for suppression of air bubbles that form in the ink supply and nozzles of a printer cartridge while an article is ultrasonically welded to the printer cartridge.

2. Description of the Related Art

In the manufacturing of printer cartridges, and especially ink jet printer cartridges, a body of the cartridge is constructed with a fluid-tight interior of the cartridge open at the top end such that ink can fill and be held within the interior of the printer cartridge. Once the printer cartridge is filled with ink, a lid is typically ultrasonically welded to the top end of the printer cartridge to thus seal the interior of the printer cartridge except for an ink outlet on the bottom end of the printer cartridge through which the ink will eventually flow for printing. An example of a prior art system of ultrasonically welding a lid to a printer cartridge is illustrated in FIGS. 2 and 3.

As shown in FIG. 2, the printer cartridge 10 is fitted and secured within a recess 30 of a mounting fixture 24 and a welding horn 26 is fitted over a lid 18 to be welded the printer cartridge 10. The welding horn 26 typically is an ultrasonic welding device that welds the lid 18 to the printer cartridge 10. When inserted into the recess 30 of the mounting fixture 24, the bottom end 14 of the printer cartridge 10 creates an air space 32 and the nozzle plate assembly 28 is in contact with the air space 32 during the welding process. The nozzle plate assembly 28, as shown in detail in FIG. 3, typically includes a heating element 34 and a nozzle plate 36, through which ink flows from an ink supply 40 to an ink outlet 38, an example being a nozzle.

Consequently, as illustrated in FIG. 3, because the air space 32 surrounds outlet 38 the vibrations from the ultrasonic welding of the lid 18 cause air bubbles 42 to form in the ink nozzle 38 and ink supply 40. The air bubbles 42 cause problems in the continuity of the flow of ink from the ink nozzle 38 during printing, and possibly even cause interruption of ink flow during printing.

To prevent the air bubbles 42 from adversely affecting the manufactured printer cartridges, manufacturers purposely store the printer cartridges for a specific period of time prior to sale and usage of the printer cartridges. This storage period, sometimes for several days, allows the air bubbles 42 to work their way into the top of the ink supply 40, which thus minimizes the risk of the air bubbles 42 adversely affecting the ink flow of the printer cartridge 10. Additionally, the air bubbles 42 can dissolve back into the ink supply 40 over several days of storage of the printer cartridge 10. However, the time required for the printer cartridges to sit in inventory results in lost revenue for the manufacturer as the sale of the printer cartridges is delayed. Moreover, the cost for the physical space required to store the sitting printer cartridges is significant as such space must be at least of a commercial quality to provide an adequate environment for the storage.

Accordingly, a system and method that can minimize air bubbles in the ink nozzle and supply of the printer cartridge during the ultrasonic welding process would be advantageous as storage of the printer cartridges for air bubbles settling or dissolving into the ink would be unnecessary. Furthermore, such system and method would produce a better quality of printer cartridges as the ink flow would not be compromised by air bubbles. It is to the provision of such an improved system and method for suppressing bubble generation during ultrasonic welding on an ink-containing printer cartridge that the present invention is primarily directed.

SUMMARY OF THE INVENTION

The present invention is a system and method for suppression of air bubble generation in the ink supply and nozzles when ultrasonic welding is performed on an ink-containing printer cartridge having a top end and a bottom end, where the bottom end includes at least one ink outlet for the ink within the printer cartridge. The system for performing ultrasonic welding on the printer cartridge includes a mounting fixture having a recess for receiving and holding at least the lower end of the printer cartridge, an ultrasonic welding device for welding an article to the printer cartridge, and a fluid or liquid collected in the bottom of the recess, the fluid or liquid present in sufficient quantity such that the at least one ink outlet on the bottom end of the printer cartridge is immersed therein upon the printer cartridge being fitted into the mounting fixture.

The fluid or liquid is preferably water although other viscous or nonviscous fluids and liquids can be alternately used in the recess of the mounting fixture. The fluid or liquid covers the one or more ink outlets, such as nozzles, whereby the outlets are in contact with the fluid or liquid and not with the ambient air in the recess. The vibrations caused from ultrasonic welding tend to cause air bubbles to form in the ink outlets and ink supply of the printer cartridge where air is present around the outlet, which is deleterious to the ink flow from the printer cartridge. Through the use of the fluid or liquid, at most, some of the fluid or liquid gets into the ink outlet and supply which has minimal deleterious effects to the ink flow.

The system preferably includes a welding horn containing the ultrasonic welding device, where the welding horn selectively fits about the top of the printer cartridge. Thus, the lower end of the printer cartridge is placed into the mounting fixture and the welding horn is placed over the top end of the printer cartridge, and a lid is preferably ultrasonically welded to the printer cartridge.

The invention further provides a method of performing ultrasonic welding upon an ink containing printer cartridge having a top end and a bottom end, the bottom end having an ink outlet for the ink within the printer cartridge, where the method includes the steps of placing the bottom end of the printer cartridge into the recess of a mounting fixture, immersing the ink outlet within a fluid in the recess, and ultrasonically welding an article to the printer cartridge. The method further preferably includes the step of securing the printer cartridge in the recess of the mounting fixture prior to ultrasonically welding an article to the printer cartridge.

The step of securing the printer cartridge in the recess of the mounting fixture is securing the cartridge preferably with a welding horn. When the welding horn is used to secure the printer cartridge, the step of welding is preferably welding a lid to the top end of the printer cartridge end. And the step of immersing the ink outlet within a fluid within the recess is preferably immersing the ink outlet within water within the recess.

The present invention provides a commercial advantage in that the use of the system and method to weld articles, and specifically lids, to ink-filled printer cartridges produces a better product than the conventional method of manufacture. The minimization of air bubbles in the ink nozzle and ink supply removes the problems associated therewith, such as interrupted ink flow and extended storage time of the printer cartridges prior to sale. Further, the finished printer cartridges more effectively pass quality testing which thus increases the yield in the production of printer cartridges.

The present invention also has industrial applicability in that the system and method can be used in existing manufacturing equipment for printer cartridges. All that is required to modify existing equipment is that the fluid or liquid be placed into the recess of the mounting fixture prior to the insertion of the printer cartridge and welding of the lid thereto. Moreover, the manufacturing equipment itself can be modified to selectively fill and drain a fluid or liquid from each recess of the mounting fixture to selectively utilize the present invention during the manufacture of printer cartridges.

Other objects, advantages, and features of the present invention will become apparent after review of the hereinafter set forth Brief Description of the Drawings, Detailed Description of the Invention, and Claims.

DETAILED DESCRIPTION OF THE INVENTION

Figure 1:
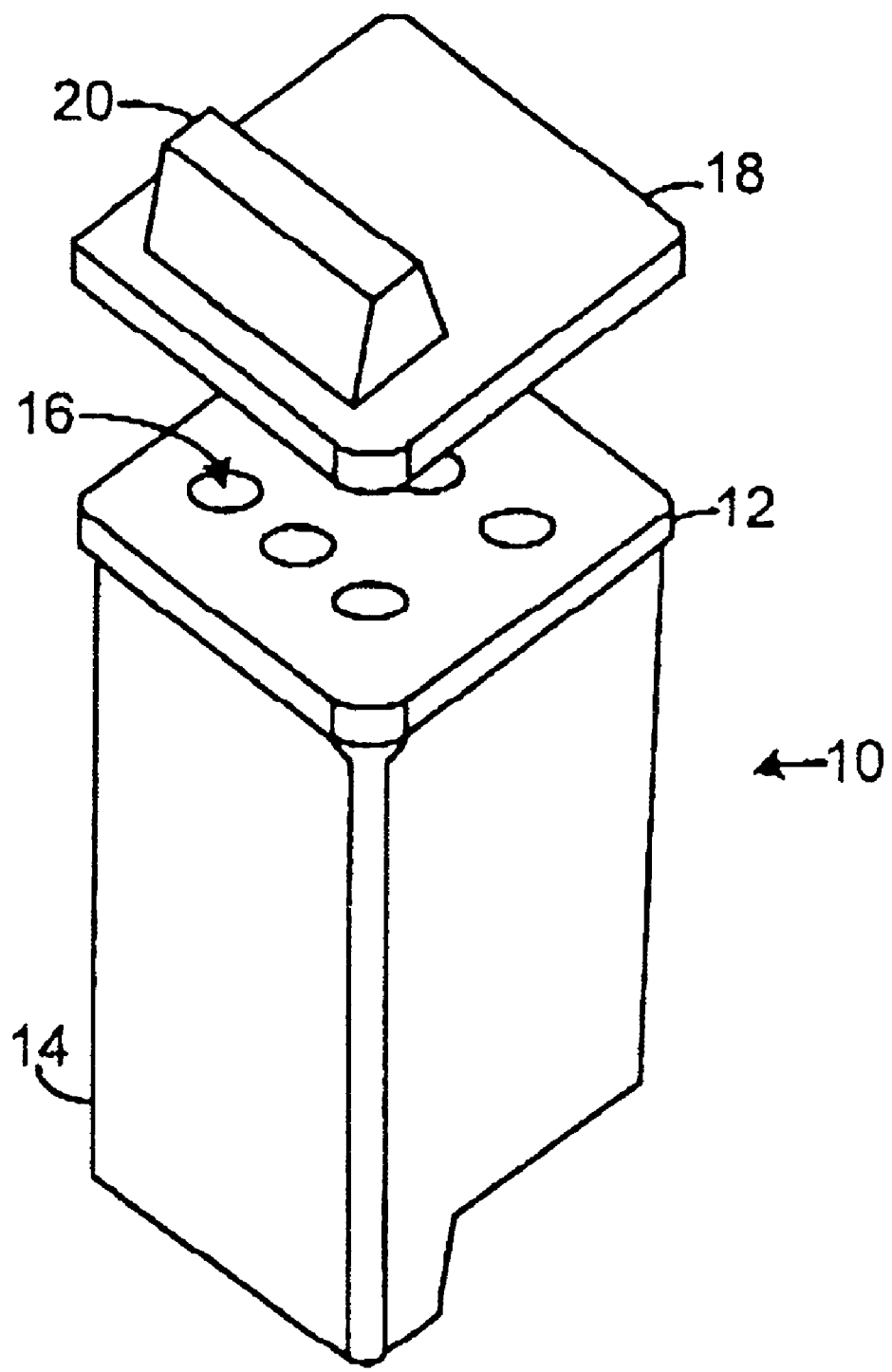
FIG. 1 is a perspective view of an exemplary printer cartridge with an unattached lid in vertical alignment with the top end of the printer cartridge.
Figure 3:
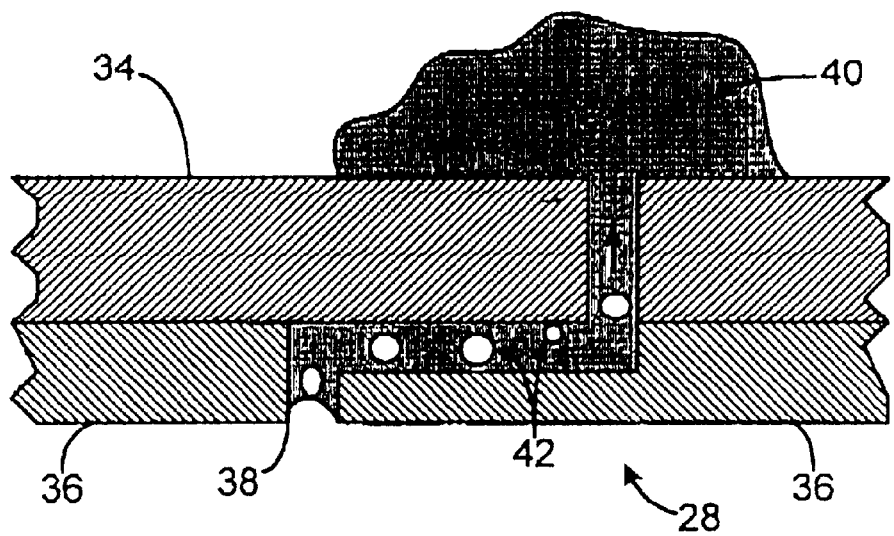
FIG. 3 is an enlarged cross-section of the ink nozzle shown in FIG. 2, illustrating air bubbles infiltrating the ink outlet and ink supply.
Figure 4:
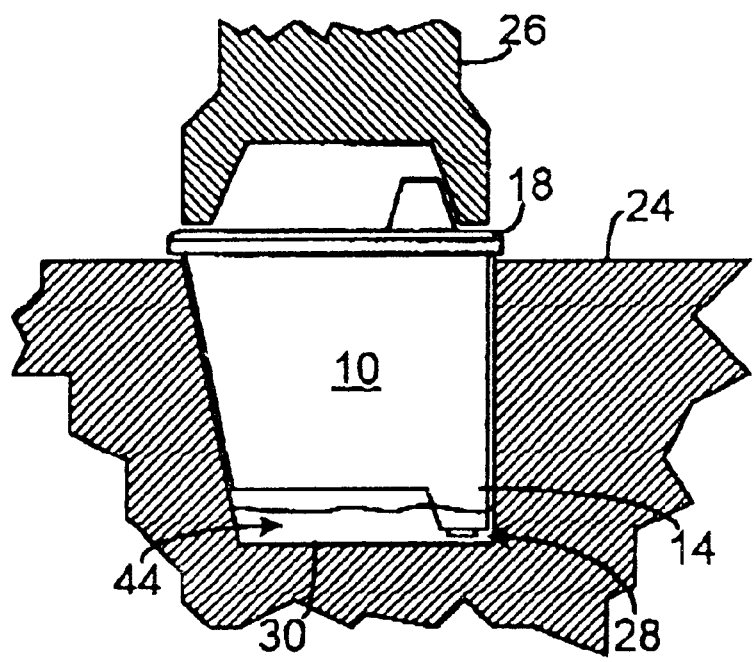
FIG. 4 is a cross-section of the present inventive system for attaching a lid to the top end of a printer cartridge with an ultrasonic welding horn while the printer cartridge is held within a mounting fixture, and a liquid is present in the recess of the mounting fixture.
Figure 5:
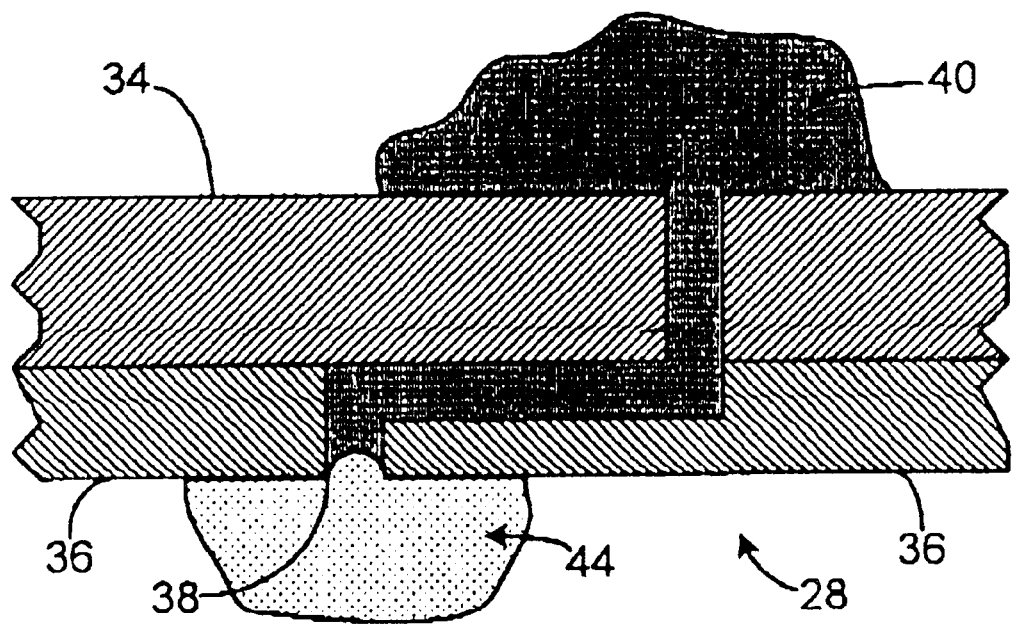
FIG. 5 is an enlarged cross-section of the ink outlet shown in FIG. 4, illustrating the liquid to ink interface at the ink outlet.

Referring now to the drawings in which like numerals represent like elements throughout the several views, FIGS. 4 and 5 illustrate a system and method for suppression of air bubble generation in the ink supply and nozzles when ultrasonic welding is performed on an ink-containing printer cartridge 10. An exemplary printer cartridge 10, as is known in the art, is shown in FIG. 1 having a top end 12 and a bottom end 14 and has at least one container 16 for the containing of ink within the printer cartridge 10. A lid 18 is shown in vertical alignment with the top end 12 and is commonly welded to the top end 12 of the printer cartridge 10 as shown in the prior art systems of FIGS. 2 and 3. The lid 18 often includes a ridge 20, or other feature which is varied depending upon the particular requirements for the printer cartridge 10. The bottom end 14 includes at least one ink outlet 38 (shown in FIGS. 3 and 5) for the ink within the printer cartridge 10. The ink outlet 38 can be an ink jet nozzle, or other ink nozzles and passages as are known in the art.

With reference to FIG. 4, the system for performing ultrasonic welding on the printer cartridge 10 includes a mounting fixture 24 having a recess 30 for receiving and holding at least the lower end 14 of the printer cartridge 10. There is a welding horn 26, or other ultrasonic welding device for welding an article to the printer cartridge 10, which here ultrasonically welds a lid 18 to the printer cartridge 10. It should be noted that the present invention can be used to minimize the formation of air bubbles 42 when articles other than a lid 18 are ultrasonically welded to the printer cartridge 10. A fluid or liquid 44 is collected in the bottom of the recess 30 and present in sufficient quantity such that the at least one ink outlet 38 (FIG. 5) on the bottom end of the printer cartridge 10 is immersed therein upon the printer cartridge 10 being fitted into the mounting fixture 24.

The fluid or liquid 44 is preferably water although other viscous or nonviscous fluids and liquids that are chemically compatible with the ink supply 40 and not deleterious to the materials comprising the printer cartridge 10 can be alternately used in the recess 30 of the mounting fixture 24. Moreover, other clear or dyeless inks, or inks having an identical color to the supplied ink can be placed in the recess 30 such that no foreign substance or air gets into the ink outlet 38 or ink supply 40 during the ultrasonic welding process.

Figure 2:
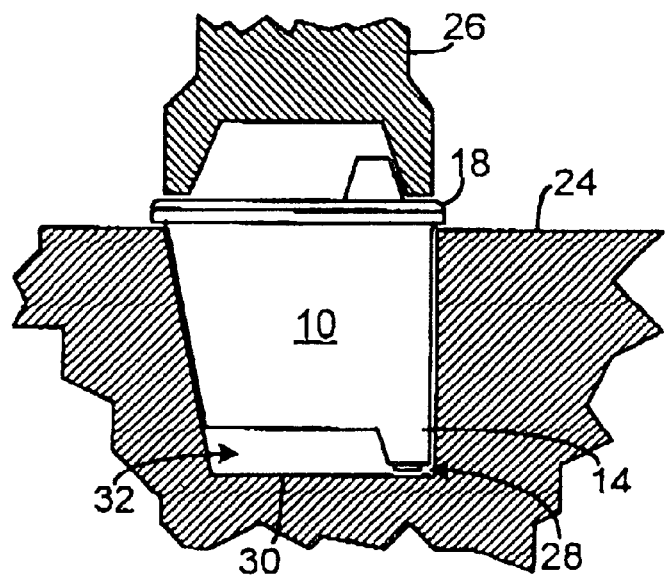
FIG. 2 is a cross-section of a prior art system for attaching a lid to the top end of a printer cartridge with an ultrasonic welding horn while the printer cartridge is held within a mounting fixture.

The fluid or liquid 44 must be present in a sufficient quantity to cover the at least one ink outlet 38 whereby the outlet 38 is in contact with the fluid or liquid 44 and not ambient air 32 in the recess 30, as is shown the prior art of FIGS. 2 and 3. As stated above, the vibrations caused from ultrasonic welding tend to cause air bubbles 42 to form in the ink outlet 38 and ink supply 40 of the printer cartridge 10, as shown in the prior art system of FIG. 3. Through the use of the fluid or liquid 44, at most, some of the fluid or liquid 44 gets into the ink outlet 38 and ink supply 40, as shown in FIG. 5, which has minimal deleterious effects in the ink flow, as opposed to the problems caused by the presence of air bubbles 42 in the ink supply 40.

The fluid or liquid 44 can be placed into the recess 30 prior to the insertion of the bottom end 14 of the printer cartridge 10. Alternately, the fluid or liquid 44 can have an inlet (not shown) into the recess 30 and the fluid or liquid 44 can fill the bottom of the recess 30 after the printer cartridge 10 is placed therein, or otherwise can selectively fill and empty the recess 30 when desired in the manufacturing process. If ink is used as the fluid or liquid 44, then ink matching the ink supply 40 in the particular printer cartridges inserted into the recesses can be selected and fill the recess 30 prior to the ultrasonic welding of the lid 18 to the top end 12 of the printer cartridge 10.

As is further shown in FIGS. 4 and 5, the invention provides a method of performing ultrasonic welding upon an ink-containing printer cartridge having a top end 12 (FIG. 1) and a bottom end 14, the bottom end 14 having an ink outlet 38 for the ink 40 within the printer cartridge 10. Such method includes the steps of placing the bottom end 14 of the printer cartridge 10 into the recess 30 of a mounting fixture 24, immersing the ink outlet 38 within a fluid or liquid 44 in the recess 30, and ultrasonically welding an article to the printer cartridge 10. The method further preferably includes the step of securing the printer cartridge 10 in the recess 30 of the mounting fixture 24 prior to ultrasonically welding an article to the printer cartridge 10.

The step of securing the printer cartridge 10 is preferably securing the printer cartridge 10 with a welding horn 26. When the welding horn 26 is used to secure the printer cartridge 10, the step of welding is preferably welding a lid 18 to the top end 12 (FIG. 1) of the printer cartridge 10. And the step of immersing the ink outlet 38 within a fluid or liquid 44 within the recess 30 is preferably immersing the ink outlet 38 within water within the recess 30.

While there has been shown a preferred embodiment of the present invention, it is to be understood that certain changes may be made in the forms and the arrangement of the components, and in the steps of the method, without departing from the spirit and scope of the invention as is particularly set forth in the claims. In addition, all means-plus-function elements of the claims are intended to encompass all structures, materials, acts and equivalents as known to one of skill in the art for performing the function in combination with the other claimed elements.

What is claimed is:

1. A system for performing ultrasonic welding on a printer cartridge containing ink and having a top end and a bottom end, the bottom end having at least one ink outlet for the ink within the printer cartridge, the system comprising:

a mounting fixture having a recess for receiving and holding at least the lower end of the printer cartridge;

an ultrasonic welding device for welding an article to the printer cartridge; and a liquid collected in the bottom of the recess, the liquid present in sufficient quantity such that the at least one ink outlet on the bottom end of the printer cartridge is immersed in the liquid.

2. The system of claim 1, further including a welding horn containing the ultrasonic welding device, the welding horn selectively fitting about the top of the printer cartridge.

3. The system of claim 2, wherein the welding horn welds a lid to the top end of the printer cartridge.

4. The system of claim 1, wherein the liquid is water.

5. A system for performing ultrasonic welding on a printer cartridge containing ink and having a top end and a bottom end, the bottom end having at least one ink outlet for the ink within the printer cartridge, the system comprising:

a mounting means for receiving and holding at least the lower end of the printer cartridge;

an ultrasonic welding means for welding an article to the printer cartridge; and a fluid collected in the bottom of the recess, the fluid present in sufficient quantity such that the at least one ink outlet on the bottom end of the printer cartridge is immersed in the fluid.

6. The system of claim 5, wherein the welding means is a welding horn containing the ultrasonic welding device, the welding horn selectively fitting about the top of the printer cartridge.

7. The system of claim 6, wherein the welding horn welds a lid to the top end of the printer cartridge.

8. The system of claim 5, wherein the fluid is water.

9. A method of performing ultrasonic welding upon an ink-containing printer cartridge having a top end and a bottom end, the bottom end having at least one ink outlet for the ink within the printer cartridge, the method comprising the steps of:

placing the bottom end of the printer cartridge into the recess of a mounting fixture;

immersing the at least one ink outlet within a fluid in the recess; and ultrasonically welding an article to the printer cartridge.

10. The method of claim 9, further including the step of securing the printer cartridge in the recess of the mounting fixture prior to ultrasonically welding an article to the printer cartridge.

11. The method of claim 10, wherein the step of securing the printer cartridge in the recess is securing the cartridge with a welding horn.

12. The method of claim 11, wherein the step of ultrasonically welding an article to the printer cartridge is ultrasonically welding a lid to the top end of the printer cartridge.

13. The method of claim 9, wherein the step of immersing the at least one ink outlet within a fluid within the recess is immersing the ink outlet within water within the recess.

* * * * *